G. J. ARMSTRONG.
ELECTRIC WELDING MACHINE.
APPLICATION FILED MAY 1, 1919.

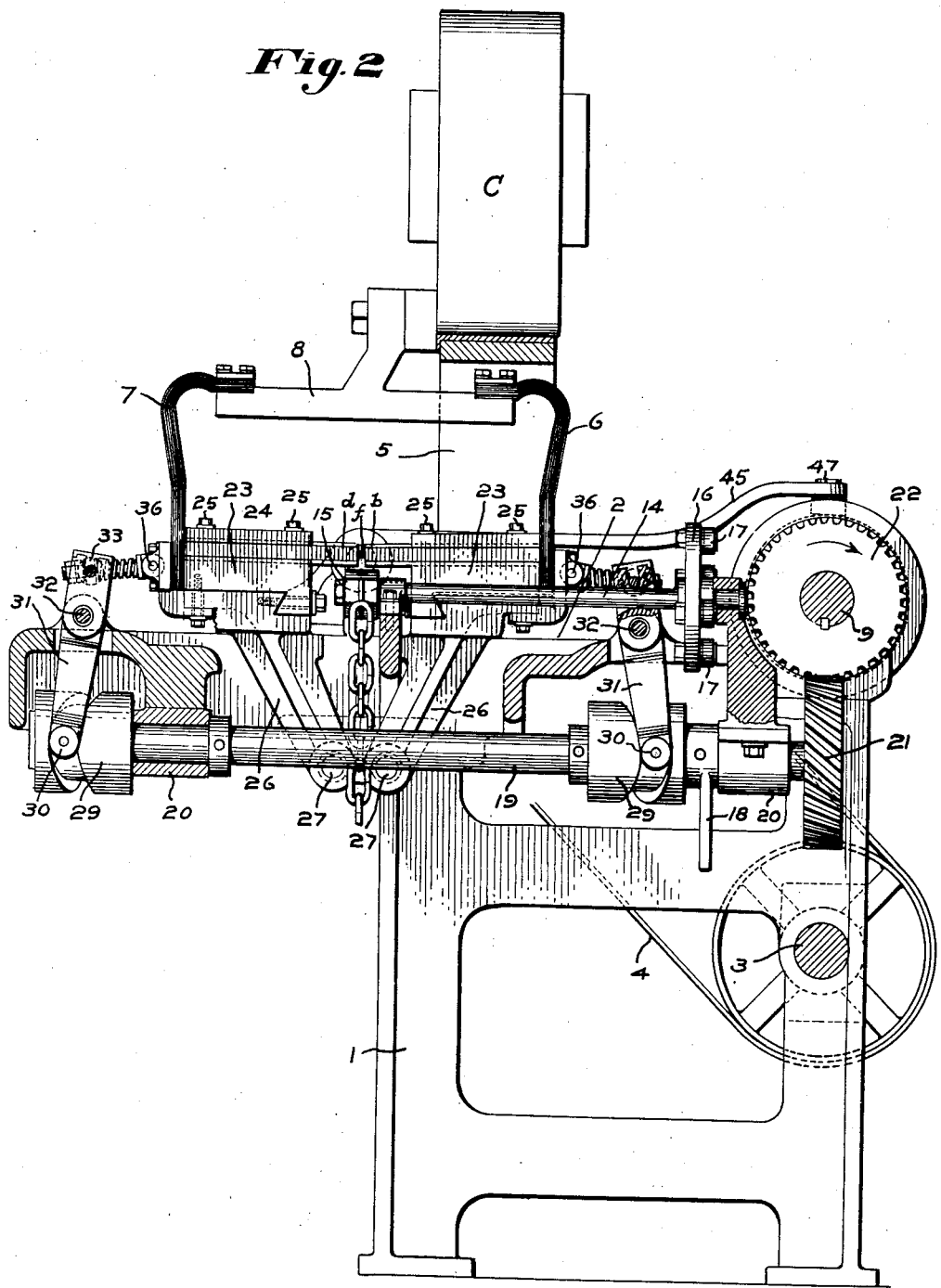

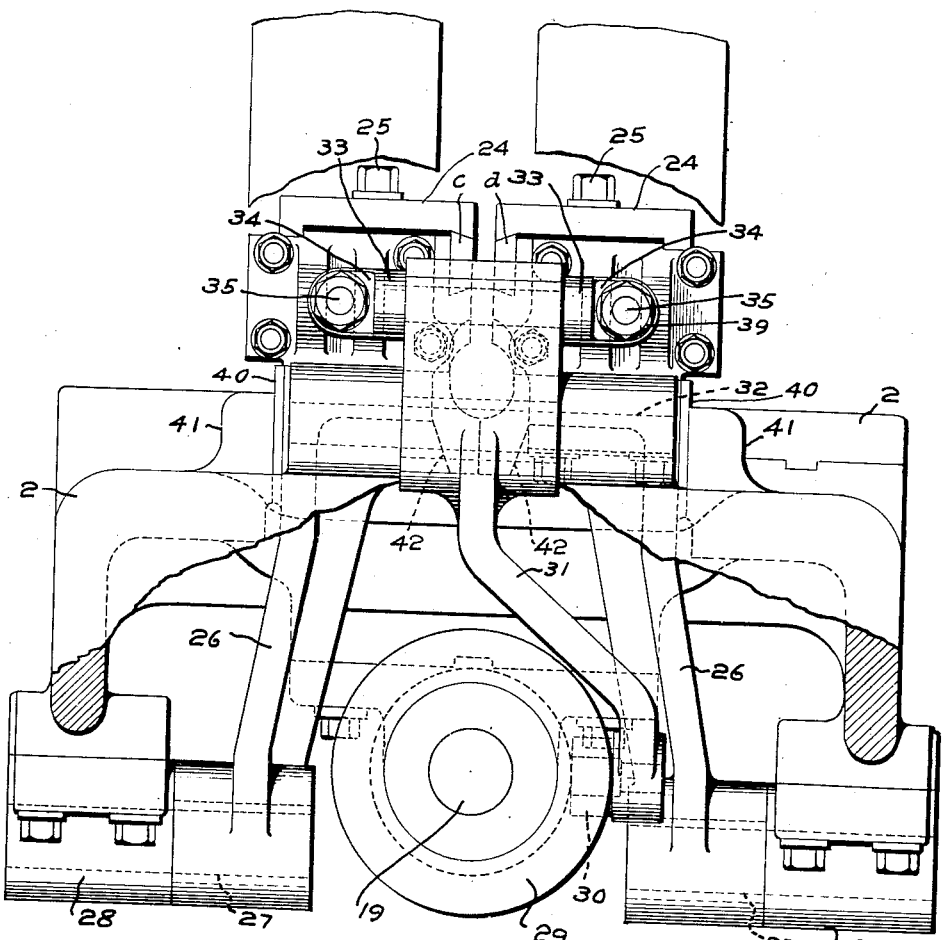
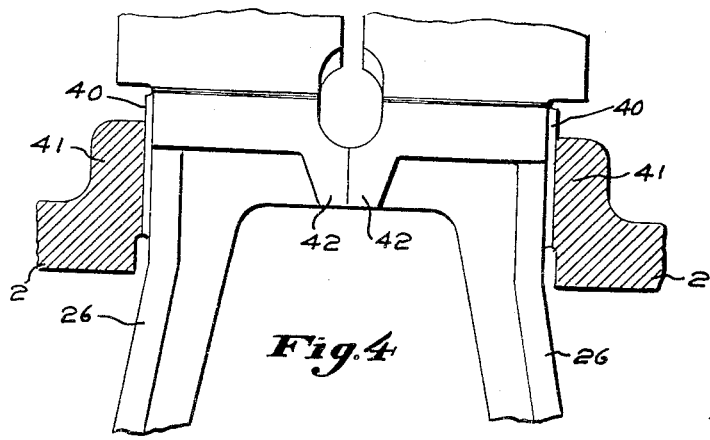

1,310,555.

Patented July 22, 1919.
4 SHEETS—SHEET 4.

Inventor:
George J. Armstrong
by Rob D. Hains
Attorney

UNITED STATES PATENT OFFICE.

GEORGE J. ARMSTRONG, OF BUFFALO, NEW YORK, ASSIGNOR TO THE COLUMBUS McKINNON CHAIN CO., INC., OF COLUMBUS, OHIO, A CORPORATION OF OHIO.

ELECTRIC WELDING-MACHINE.

1,310,555.  Specification of Letters Patent.  Patented July 22, 1919.

Application filed May 1, 1919. Serial No. 294,022.

*To all whom it may concern:*

Be it known that I, GEORGE J. ARMSTRONG, a citizen of the United States, and a resident of Buffalo, in the county of Erie and State of New York, have invented an Improvement in Electric Welding-Machines, of which the following description, in connection with the accompanying drawings, is a specification, like characters on the drawings representing like parts.

The invention to be hereinafter described relates to machines for electrically welding the abutting ends of chain links previously formed into a substantially oval or closed geometrical figure.

As well understood by those skilled in the art, a chain which is to have the joint in the links electrically welded, is first formed, preferably on a chain forming machine, which bends the metal blanks into substantially oval, round, or oblong shape, with the ends of the blank in closely abutting relation. As ordinarily practised, the abutting ends of the link blank are electrically welded by bringing the link at opposite sides of the abutting joint into contact with electrodes, through which current passes to heat the metal to the welding point.

In the electric chain welding machines which are now in common use for welding chain, it has been usual to provide two welding electrodes arranged to engage the outer surface of the link at opposite sides of the joint, and the end faces of the link or joint are so formed that when they are brought together in the forming machine, they contact usually at the inside edge of the link, thus leaving a V-shaped gap between the ends. This is due, to a large extent, to the fact that when the link blank is bent around the mandrel, the inner surface of the curve causes the metal to crowd together and, consequently, force portions of the metal at the inner portion of the curve toward the end of the blank, while the metal at the outer surface of the blank is stretched, the tendency being to emphasize the V-opening. When a joint of the character noted is electrically welded, the electric current first flows through the lines of least resistance which, of course, are the contacting parts of the V-opening. By reason of this V-opening and the gradual heating of the ends of the link blank, portions of the metal are liable to be over-heated and cause an imperfect weld.

In a prior application, Serial No. 207,890, filed December 19, 1917, an electric welding machine was provided wherein a plurality of pairs of electrodes were employed, one electrode of each pair being at opposite sides of the joint, and the joint was formed as a substantially true butt joint, that is, without the V-opening. This character of joint is formed in a well known kind of chain forming machine and the surfaces at the ends of the blank when brought together are in substantially abutting relation without the V-opening between them. By virtue of the plurality of pairs of electrodes when brought into contact with the link with the electrodes of each pair at opposite sides of the joint, the current was caused to flow simultaneously through the joint at a plurality of points, and substantially in a direction longitudinally of the link, the effect being to more quickly raise the abutting ends of the link to the welding point and to secure a more uniform and perfect heating of the abutting ends of the link. Such machine has proved itself in practice to be most efficient and to economize in time, labor and expense, over the old method of electric welding.

In the prior machine referred to, the pairs of electrodes were mounted to slide upon their supports. When the parts of the link are brought to the welding heat, sparks fly, and pieces of metal are apt to get between the electrode holder and slide on which it is mounted, the effect being to ultimately score and form deep furrows between the slide and carrier. This may become emphasized and cause lost motion between the parts and may eventually cut through so as to destroy the insulation.

An important feature of the present invention, therefore, consists in mounting the welding electrodes upon the swinging supports so that they may be yieldingly moved into contact with the chain links and accommodate themselves to any variations in the engaged portions of the link. In the present instance of the invention, as will presently appear, while the electrodes are arranged in pairs, and the two electrodes of each pair are of opposite polarity, to engage the link at opposite sides of the joint, it has been found expedient in practice to mount each of the electrodes on a separate carrier and swinging arm, and to actuate the arms by a single means permitting relative movement of the electrodes in accommodating themselves to the character of the link engaged. Of course, other arrangements may be suggested, but the above has been found to be of effective and convenient construction.

Other features of the invention will appear from the following description and accompanying drawings showing a good, practical form or embodiment of the invention, and then the various features of the invention will be definitely defined by the claims.

In the drawings:

Fig. 2 is a sectional elevation on the line 2—2 of Fig. 1;

Fig. 3 is an enlarged front view with some of the parts broken away and others omitted, and showing more particularly the swinging arms or supports for the electrodes, and the single actuating means for the electrodes of a pair;

Fig. 4 is an enlarged detail, partly in section, showing more particularly the manner of guiding the swinging arms to move the electrodes in proper direction toward and from the chain link to be welded;

Figure 1:
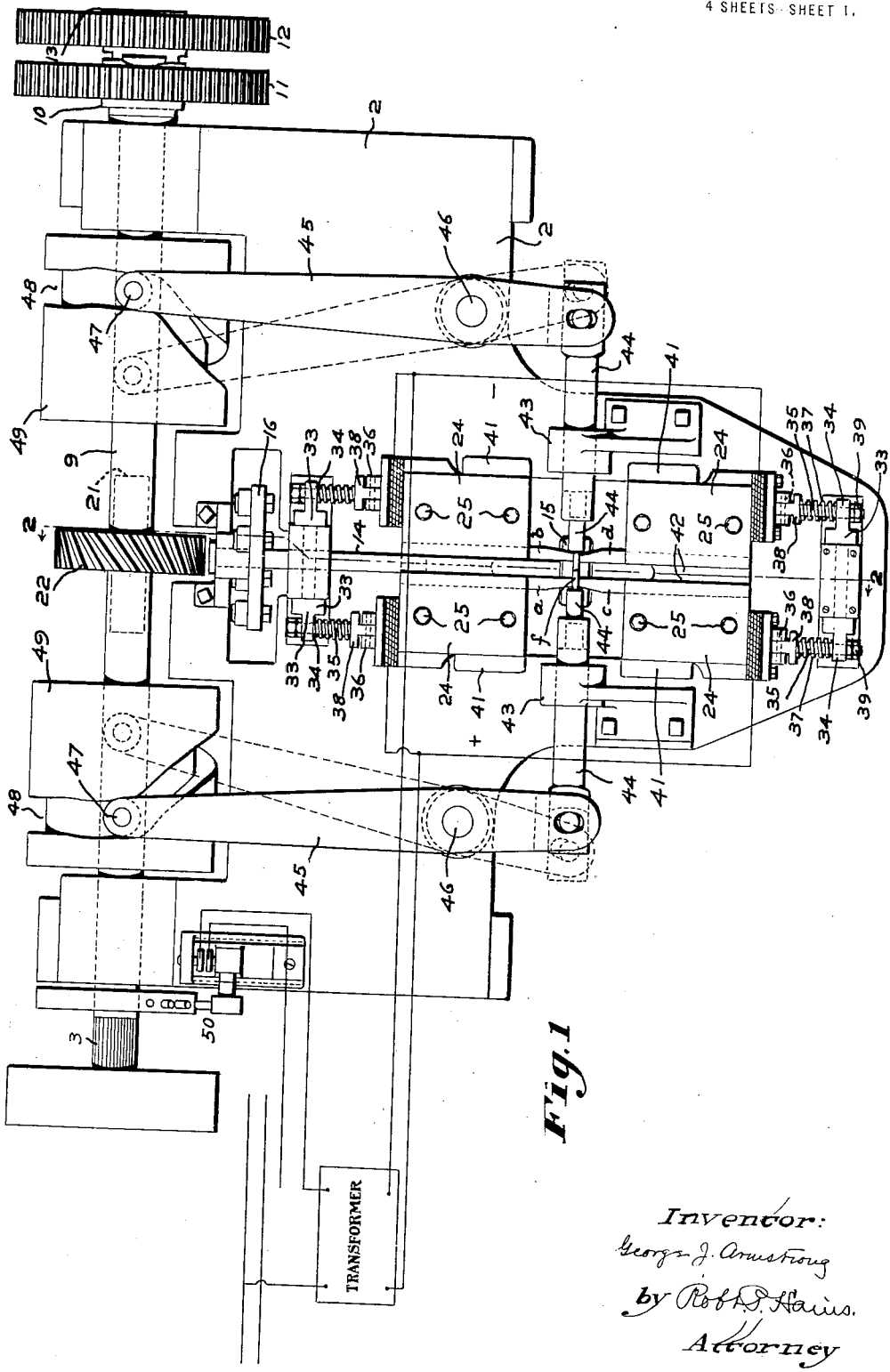
Figure 1 is a plan view of the machine embodying the present invention.

The machine frame may be of any usual character suitable for supporting the operating parts and, as hereinbefore shown, comprise the side frames 1 surmounted by a top 2 constituting a support or table top. Mounted in suitable bearings in the machine frame is the driving shaft 3 which may derive movement from a suitable source of power as, for instance, through the belt 4.

A usual transformer C may be supported from the machine frame by suitable uprights 5, Fig. 2, and the electrodes, to be hereinafter described, may be suitably connected with the transformer by conductors 6, 7, connected to the support 8 communicating with the transformer.

Mounted in bearings in the machine frame is the back or cam shaft 9 which may be driven from the driving shaft 5 through suitable intermediate driving connections, which, in the present instance of the invention, comprises the gears 10, 11, 12, and 13.

The chain, the links of which are to be electrically welded, is fed through the machine by appropriate chain feeding means. In the present instance the chain feed shaft 14, Figs. 2 and 3, is mounted in suitable bearings in the machine frame, and carries a chain feed block 15 provided with suitable grooved and recessed portions for engaging the links of the chain and maintaining the links in proper position for contact by the welding electrodes, as will more fully appear. The shaft 14 has secured thereto the wheel or disk 16, Figs. 1 and 2, provided with a series of feed pins 17 which are adapted at times to be engaged by an operating arm 18 carried on a shaft 19, as will be apparent from Fig. 2, the construction being such that as the shaft 19 is rotated through suitable means to be presently described, the operating arm 18 will strike one of the pins or rollers 17 and give the feed shaft 14 a chain feed movement to present a new link into the field for treatment by the electrodes. The shaft 19 is carried in suitable bearings 20 supported by the machine frame and extends from front to rear of the machine. At its rear end portion it is provided with the toothed wheel 21, Fig. 2, which is in operative engagement with a coöperating toothed wheel 22 on the shaft 9. The wheels 21 and 22 may be appropriately made as either spiral toothed gears or worm and worm wheel, the construction being such that when the shaft 9 is rotated, suitable rotative movement in proper timed relation will be transmitted to the shaft 19.

The electrodes, as hereinbefore stated, are arranged in pairs, the electrodes of each pair being of opposite polarity and mounted for movement to engage and disengage the link to be welded at opposite sides of the joint of the link. In order that the electrodes may be properly moved to engage and disengage the link as above pointed out, and yet obviate the difficulties and objections incident to mounting the electrodes upon sliding elements, the present invention contemplates that the electrodes shall be mounted on carriers or arms which are pivotally connected to a convenient support, such as the machine frame. In the present instance of the invention, each of the electrodes $a$, $b$, $c$, $d$, are mounted on a block 23 and are preferably secured thereto by a binding plate 24, Figs. 2 and 5, which may be secured to the block by suitable bolts 25. Obviously, the electrodes may be otherwise secured to the carrier blocks 23, but the above connection serves as a good practical embodiment of this feature of the invention.

Each of the carrier blocks 23 is mounted upon an arm 26 pivotally mounted at 27 on the machine frame or a bracket 28 conveniently supported by the frame, and, of course, each of the electrode carrying blocks 23 is insulated from its carrying arm. The position of the pivotal supports for the swinging arms 26 may be varied to suit different conditions, but in the present instance of the invention the pivotal supports for the arms 26 are arranged below the path of chain feed movement, and swinging movement is imparted to the arms at desired times through suitable actuating means to cause the pairs of electrodes to engage and disengage the link positioned for treatment.

Figure 5:
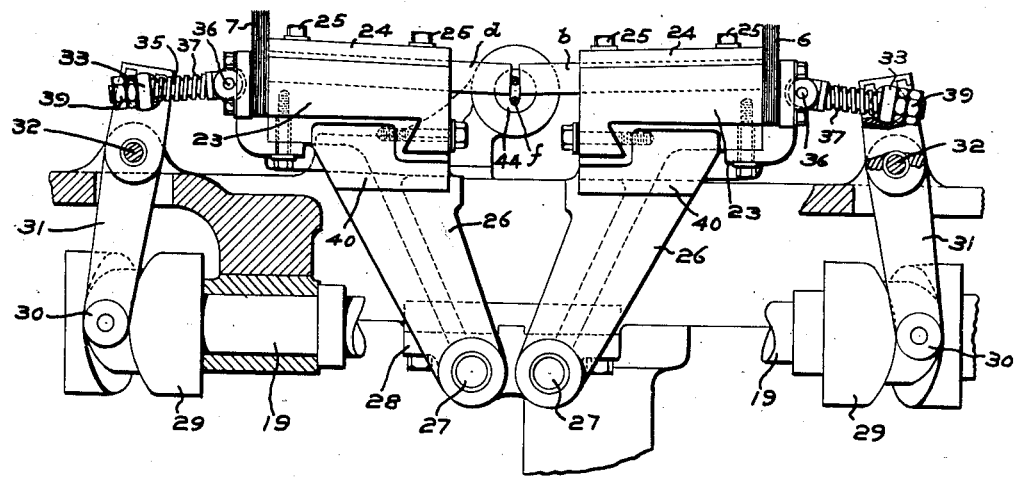
Fig. 5 is an enlarged detail, with some of the parts shown in section, illustrating the swinging supports for the electrodes, which are shown in contact with a link to be welded.
Figure 6:
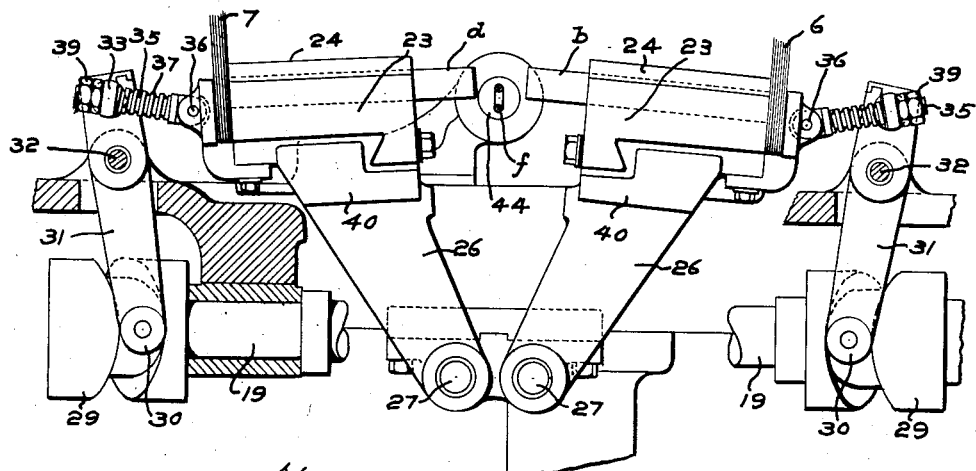
Fig. 6 is a view similar to that of Fig. 5, showing the electrodes withdrawn from contact with the chain link.
Figure 7:
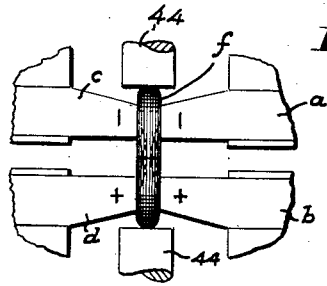
Fig. 7 is an enlarged detail showing two pairs of welding electrodes, the electrodes of each pair being of opposite polarity and in engagement with the link at opposite sides of the link joint and showing, also, the general direction of the electric current between the opposite and negative electrodes.

In the present instance of the invention each of the electrodes $a$, $b$, $c$ and $d$, as indicated in Fig. 7, is independently supported by its carrier block and swinging arm, and suitable connections from the shaft 19 serve to swing the arms 26 about their pivotal supports to engage and disengage the electrodes with the chain link to be welded. As indicated in Figs. 2, 5 and 6, the shaft 19 is provided with cams 29 which are engaged by suitable rollers or pins 30 mounted on the actuating arms 31, pivotally supported at 32 upon the machine frame. The upper end portion of the actuating arms 31, of which there are two in the present instance, are slotted to receive a yoke 33, the ends of which extend laterally from either side of the slotted upper end portion of the actuators 31, as indicated in Figs. 1 and 3. The yoke 33 has its ends 34 perforated for the passage of the links 35 which are connected at 36 to appropriate lugs secured to the swinging arms 26 or the connected blocks 23. Springs 37 are interposed between the shouldered portions 38 of the link 35 and the ends 34 of the yoke, and suitable nuts 39 are threaded to the links 35 outside the yoke, the construction being such that while the single actuator 31 serves to move a pair of electrode carrying blocks or arms 26, the movement of the electrodes is made yielding and in a measure independent to permit the electrodes of a pair to accommodate themselves to the condition of the link engaged by them. Where the yoke 33 passes through the upper slotted end portion of the actuator 31, the yoke is of general cylindrical shape to permit the yoke to rock as its connected actuator 31 is moved about its pivot 32.

From the construction hereinbefore described as setting forth one good practical form of the present invention, it will be understood that the electrodes of each pair are mounted for simultaneous movement toward and from the link to be welded and yet each has capacity for yielding movement to accommodate itself to the link. Other forms of mechanism may be employed for moving the pairs of electrodes, but the above described means has been found to be commercially practical and efficient. Where the electrodes are each independently mounted upon its swinging arm, as in the described form of the invention, it is desirable to guide the electrodes in their swinging path of movement. To this end the upper portion of the swinging arms 26, as indicated in Figs. 3 and 4, is provided with a guide piece 40 which is in sliding engagement with an opposed guide piece 41 on the machine frame. At their adjacent upper portions, the arms 26 are provided with flanges or guiding pieces 42, the adjacent faces of such guiding pieces 42 being in sliding engagement. The construction is such that as the swinging arms on which the electrodes are mounted, are moved by the actuating mechanism hereinbefore described, the upper end portions of the arms 26 are accurately guided and the electrodes are moved in predetermined paths without lost motion and in accurate relation to engage and disengage the link to be welded.

When the abutting end portions of the link have been brought to the welding heat, it is desirable that the link be subjected to pressure lengthwise or in a direction to force the abutting portions of the link together. Various means may be devised for this purpose, but in the present instance of the invention the machine frame or table top is provided with guides 43, through which reciprocate the pressure plungers 44, one at either side of the welding station. The outer end portions of the plungers 44 are connected respectively to operating levers 45 pivotally mounted on the machine frame at 46 and having a portion 47 engaging a cam groove 48 formed in a cam block 49 secured to the shaft 9, the construction and timing of parts being such that when a link, the abutting joint of which is to be welded, has been brought to the welding heat, the plungers 44 may be given a movement of approach to subject the link to pressure and enable the joint to be uniformly and reliably welded together.

Suitable means, as indicated at 50, may be provided for controlling the current passing from the transformer to the electrodes, said electrodes being connected to the transformer through the conductors 6 and 7, Fig. 2, as hereinbefore pointed out.

In Fig. 7 a link $f$ of a chain to be welded, is shown in position with the pairs of electrodes in engagement with the link, the electrodes of each pair being at opposite sides of the joint, and the dotted lines indicate in a general way the passage of the electric current between the electrodes of each pair which, of course, are of opposite polarity. It will be noted that the electric current passes through the joint between the electrodes of each pair and that the direction of the current is substantially longitudinally of the link. When the pairs of electrodes are brought into engagement with the link, as indicated in Fig. 7, the electric currents will simultaneously pass through the joint and quickly raise the metal at the abutting ends of the link to the welding point, whereupon the plungers 44 are given a movement of approach to subject the link to pressure.

In the present embodiment of the invention, there are two pairs of welding electrodes shown, and these are arranged substantially on opposite sides of the chain feed movement so as to engage the link to be welded at opposite sides thereof. This has been found to be an efficient and practical form of the invention, but, of course, the invention is not restricted thereto because a greater number of pairs of welding electrodes may be employed and, obviously, they may be arranged in different relations about the link to be welded. By supporting the electrodes upon swinging or pivotal arms or other carrying elements, as hereinbefore described, all of the objections incident to the use of slides between the electrodes and their supports are overcome and the pivotal mountings are incased and inclosed in such a manner that pieces of metal cannot get between the moving parts.

Claims:

1. In an automatic electric chain welding machine, the combination of means for feeding a chain the links of which are to be electrically welded, a plurality of pairs of welding electrodes, the two electrodes of each pair being of opposite polarity to cause the currents between the electrodes of each pair to flow through the link joint in the same direction, means for supporting the electrodes for swinging movement into and out of contact with a link of the chain to engage the electrodes of each pair at opposite sides of the link joint and remove them from such engagement, and means for pressing together the ends of the link.

2. In an automatic electric chain welding machine, the combination of means for feeding the chain the link joints of which are to be electrically welded, two pairs of welding electrodes, the two electrodes of each pair being of opposite polarity to cause the currents between the electrodes of each to flow through the link joint in the same direction, means for moving the welding electrodes in a curved path intersecting the path of chain feed movement to engage the electrodes of each pair with different portions of the link at opposite sides of the link joint to be welded and to remove the pairs of electrodes from the path of chain feed movement, and means for pressing together the ends of the link.

3. In an electric chain welding machine, the combination of means for feeding a chain the links of which are to be electrically welded, a plurality of pairs of welding electrodes, the two electrodes of each pair being of opposite polarity to cause the currents between the electrodes of each pair to flow through the link joint in the same general direction longitudinally of the link, pivotally mounted arms carrying the electrodes, means for moving the arms about the axis of the pivots to carry the electrodes into and out of contact with a link of the chain to engage the electrodes of each pair with the link at opposite sides of the link joint and remove them from such engagement, and means for pressing together the ends of the link.

4. In an automatic electric chain welding machine, the combination of means for feeding a chain the links of which are to be electrically welded, two pairs of welding electrodes oppositely disposed, the two electrodes of each pair being of opposite polarity, pivotally mounted carriers on which said electrodes are respectively mounted, means for moving said carriers about their pivots to engage the electrodes of each pair with a chain link at opposite sides of the link joint, and means for forcing the ends of the link together.

5. In an automatic electric chain welding machine, the combination of means for feeding a chain the links of which are to be electrically welded, welding electrodes, pivotally mounted arms on which the welding electrodes are supported, means for swinging the arms about their pivots for engaging and disengaging the welding electrodes at opposite sides of the link joint of a chain to be welded, and means for pressing the ends of the link together while the link joint is being welded.

6. In an automatic electric chain welding machine, the combination of means for feeding a chain the links of which are to be electrically welded, welding electrodes, pivotally mounted arms on which the welding electrodes are mounted, cams for swinging the arms to engage and disengage the electrodes with the link to be welded, yielding means between the cams and swinging arms to permit the electrodes to accommodate themselves to the link to be welded, and means for pressing the link joint together during the welding operation.

7. In an automatic electric chain welding machine, the combination of a frame having a table like support, welding electrodes, swinging arms pivotally supported below the table and carrying the electrodes, means for swinging the arms to carry the electrodes into and out of contact with the link of a chain which is to be welded, and means for pressing the link joint together during the welding operation.

8. In an electric chain welding machine, the combination of means for feeding a chain, the links of which are to be welded, welding electrodes which are movable at opposite sides of the chain link into and out of contact therewith, swinging arms carrying said electrodes, means for swinging the arms, and a presser device for pressing together the ends of the link being welded.

9. In an electric chain welding machine, the combination of chain feeding means, welding electrodes for engaging the link of a chain to be welded at opposite sides of the abutting ends of the link, means for swinging the electrodes into and out of contact with the link to be welded, and means for pressing the abutting ends of the link together during the welding operation.

10. In an electric chain welding machine, the combination of chain feeding means, welding electrodes for engaging the link of a chain to be welded at opposite sides of the abutting ends of the link, means for swinging the electrodes into and out of contact with the link to be welded including yielding devices to permit the electrodes to accommodate themselves to the link.

In testimony whereof, I have signed my name to this specification.

GEORGE J. ARMSTRONG.